US007670261B2

(12) United States Patent
Hälleberg et al.

(10) Patent No.: US 7,670,261 B2
(45) Date of Patent: Mar. 2, 2010

(54) FUEL PRESSURE CONTROL IN A COMMON RAIL SYSTEM

(75) Inventors: Roger Hälleberg, Nacka (SE); Magnus Pettersson, Södertälje (SE)

(73) Assignee: Scania CV AB (publ) (SE)

( * ) Notice: Subject to any disclaimer, the term of this patent is extended or adjusted under 35 U.S.C. 154(b) by 464 days.

(21) Appl. No.: 11/575,347

(22) PCT Filed: Aug. 31, 2005

(86) PCT No.: PCT/SE2005/001264

§ 371 (c)(1),
(2), (4) Date: May 23, 2007

(87) PCT Pub. No.: WO2006/031167

PCT Pub. Date: Mar. 23, 2006

(65) Prior Publication Data

US 2008/0040017 A1 Feb. 14, 2008

(30) Foreign Application Priority Data

Sep. 15, 2004 (SE) .................................... 0402222

(51) Int. Cl.
*B60W 10/04* (2006.01)
*G06F 17/00* (2006.01)

(52) U.S. Cl. ........................................ 477/109; 701/54

(58) Field of Classification Search .................. 477/109
See application file for complete search history.

(56) References Cited

U.S. PATENT DOCUMENTS

| | | | | |
|---|---|---|---|---|
| 4,403,527 | A * | 9/1983 | Mohl et al. | 477/32 |
| 5,036,728 | A * | 8/1991 | Kawasoe et al. | 477/109 |
| 6,024,064 | A | 2/2000 | Kato et al. | |
| 6,035,829 | A | 3/2000 | Hartke et al. | |
| 6,267,707 | B1 * | 7/2001 | Bock | 477/109 |

FOREIGN PATENT DOCUMENTS

DE 101 58 547 A1 6/2002

OTHER PUBLICATIONS

International Search Report PCT/SE2005/001264 dated Nov. 10, 2005 (Swedish Patent Office).

* cited by examiner

*Primary Examiner*—Dirk Wright
(74) *Attorney, Agent, or Firm*—Ostrolenk Faber LLP

(57) ABSTRACT

The present invention relates to the control of fuel pressure in a common rail engine in connection with an automatic gear-shift procedure. Upon receipt of a primary gearshift command, a fuel pressure in the common rail fuel system is decreased. This decrease is initiated during a time interval prior to reducing engine torque. A gear is released after the engine torque is lowered, thereby enabling a smooth gear release.

20 Claims, 2 Drawing Sheets

FUEL PRESSURE CONTROL IN A COMMON RAIL SYSTEM

CROSS REFERENCE TO RELATED APPLICATIONS

The present application is a 35 U.S.C. §371 national phase conversion of PCT/SE2005/001264 filed Aug. 31, 2005, which claims priority of Swedish Application No. 0402222-4 filed Sep. 15, 2004, which are herein incorporated by reference. The PCT International Application was published in the English language.

BACKGROUND OF THE INVENTION

1. Field of the Invention

The present invention relates generally to combustion fuel vehicles, and, more particularly, to controlling fuel pressure in a common rail engine.

2. Description of the Related Art

Engines with common rail fuel injection systems are becoming increasingly popular. One important reason for this recognition is that varying the fuel pressure in the rail may reduce the average amount of emissions, such that, for each operating condition of the engine, an adequate fuel amount enters the engine. So far, the common-rail types of engines have mainly been developed for passenger cars. Now however, this technology is also introduced in heavy vehicles, such as trucks and busses, which are normally equipped with diesel engines. This places new requirements on the technical solutions.

DE 101 58 547 describes a fuel injection device for an internal combustion engine, wherein a reduced fuel pressure is enabled in a common rail by means of a piezo based actuator and a leak passage. An injected fuel pressure below the current pressure level in the common rail is here accomplished by discharging excessive fuel through the leak passage back to the fuel tank.

U.S. Pat. No. 6,024,064 discloses a high pressure fuel injection system for an internal combustion engine, wherein the fuel pressure in a common rail may be reduced electronically according to the engine operating conditions, for example in shifting-up of an automatic transmission.

Although fuel pressure may be reduced in connection with gearshift procedures taught in the prior art, under certain operating conditions, the fuel pressure level may still be too high when the original gear actually is released. One example of such an operating condition is when a vehicle drives uphill and a gearshift should be made to reduce the wheel torque. In order to enable a gear release, the engine torque must be lowered substantially, so that the torque in the gearbox practically attains a zero value. At least in diesel engines, the engine torque is approximately proportional to the amount of fuel injected into the engine's combustion chambers. Thus, if the fuel pressure is relatively high and a low torque is required (i.e. equivalent to a small amount of fuel), the opening time for the fuel actuator must be very short. Such short bursts of fuel often result in loud noises and undesired knockings, inter alia, because the overall opening time is insufficient to allow so-called "pilot injections." Moreover, the interval during which the fuel actuator in the fuel injector feeds fuel into the combustion chamber is associated with certain tolerances, i.e., uncertainties as to the exact timing of the opening and the closure of the actuator. Hence, for short opening times these tolerances are comparatively large, perhaps in the same order as the opening time, and the resulting engine torque, therefore, becomes difficult to predict with a satisfying degree of certainty. In other words, a repeatable torque cannot be guaranteed at low levels of engine torque, for examples when releasing a gear in an automated manual gearbox, or anther type of automatically controlled gearbox. Consequently, sometimes a gearshift may be performed rather smoothly, whereas at other instances with similar conditions, uncomfortable slams and jerks may occur. Of course, this may annoy the driver and the vehicle's transmission system risk to deteriorate.

SUMMARY OF THE INVENTION

The object of the present invention is therefore to provide a solution, which alleviates the problems above, and thus offers a comfortable, efficient and repeatable automatic gearshift procedure for a vehicle equipped with an engine of common-rail type.

According to one aspect of the invention, the object is achieved according to the invention, wherein the control system is adapted to initiate a decrease of a fuel pressure in the common rail fuel system in response to a primary gearshift command. The pressure decrease is initiated before the lowering of the engine torque is started. For instance, an appropriate premature timing may be accomplished by initiating the decrease of the fuel pressure at a first point in time before a second point in time when the lowering of the engine torque is commenced, where the time difference between the first and second points is selected with respect to an initial fuel pressure in the common rail fuel system at reception of the primary gearshift command in relation to a target fuel pressure desired upon releasing an original gear.

An important advantage attained by this arrangement is that a repeatable engine torque is enabled throughout the entire gearshift process. Namely, the proposed early pressure decrease renders it possible to reach such a low fuel pressure at the time of the gear release that the fuel actuators' opening time may be relatively long also at very low torque values. Moreover, pilot injections may be used to reduce certain undesired engine sounds.

According to one embodiment of the invention, the control system is adapted to raise the engine torque after having engaged a new gear, i.e. after completing the gearshift operation. However, the fuel pressure increase is initiated no earlier than when the engine torque is raised. Thereby, a low fuel pressure is guaranteed during the time it takes to release a first gear, and to synchronize and engage a second gear.

According to another embodiment of this aspect of the invention, the control system includes a gearbox control unit adapted to generate a secondary gearshift command, which causes a release of the original gear. This design is desirable because it enables a gearshift that is dependant upon transmission relevant parameters. For example, the gearbox control unit may be adapted to generate the secondary gearshift command if the engine torque has reached (i.e. been lowered to) a first threshold value.

According to yet another embodiment of this aspect of the invention, the gearbox control unit is adapted to generate the secondary gearshift command only if the fuel pressure in the common rail fuel system has reached (i.e. been lowered to) a second threshold value. Thus, the original gear will not be released until the fuel pressure is sufficiently low to allow a smooth operation.

According to still another embodiment of this aspect of the invention, the control system includes a command bus adapted to transmit the primary and secondary gearshift commands. This type of signal transmission is preferable, since it enables an efficient communication interface between the units of the design, as well as interaction between these units and other units and systems in the vehicle.

According to another embodiment of this aspect of the invention, the control system includes at least one additional electronic control unit, which is attached to the command bus and is further adapted to control the operation of the engine, the gearbox or the common rail fuel system. Such a distributed system is highly desirable, for example with respect to reliability and redundancy.

According to another aspect of the invention the object is achieved by a motor vehicle, which includes the above-proposed arrangement. Naturally, such a vehicle is advantageous for the same reasons as described above.

According to another aspect of the invention, the object is achieved by the method described initially, wherein a fuel pressure in the common rail fuel system is initiated to decrease in response to the primary gearshift command. Moreover, the pressure decrease is initiated prior to commencing the lowering of the engine torque.

The advantages of this method, as well as the preferred embodiments thereof, are apparent from the discussion hereinabove with reference to the proposed vehicle arrangement.

According to a further aspect of the invention the object is achieved by a computer program directly loadable into the internal memory of a computer, comprising software for controlling the above proposed method when said program is run on a computer.

According to another aspect of the invention the object is achieved by a computer readable medium, having a program recorded thereon, where the program is to make a computer control the above proposed method.

Hence, the invention offers a technically uncomplicated and reliable fuel pressure control. The proposed solution is thereby particularly well suited for demanding applications, such as in heavy vehicles.

Further advantages, advantageous features and applications of the present invention will be apparent from the following description and the dependent claims.

BRIEF DESCRIPTION OF THE DRAWINGS

The present invention is now to be explained more closely by means of embodiments, which are disclosed as examples, and with reference to the attached drawings.

DESCRIPTION OF EMBODIMENTS OF THE INVENTION

Figure 1:
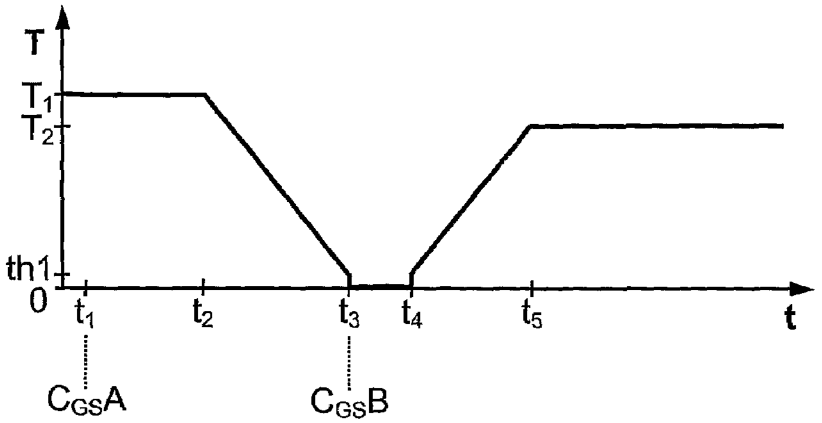
FIG. 1 shows a diagram which illustrates how an engine torque may be varied in connection with a gearshift operation according to one embodiment of the invention.

FIG. 1 shows a diagram which illustrates how an engine torque T may be varied over time t in connection with a gearshift operation according to one embodiment of the invention. The vertical axis shows the engine torque T, and the horizontal axis represents the time t.

Here, we assume that a gearshift order is received in the form of a primary gearshift command $C_{GS}A$ at a first point in time $t_1$. Then, at a later point in time $t_2$, the engine torque T is scheduled to be reduced from an original level $T_1$ in order to prepare the transmission for the upcoming gearshift. The actual gearshift takes place between the yet later instances $t_3$ and $t_4$.

At $t=t_3$ the engine torque T has reached a first threshold value th1 at which it is estimated that the gearbox torque is so low that an original gear can be released under fulfillment of certain criteria, e.g. with respect to mechanical stress and driver comfort. Therefore, at $t_3$ a secondary gearshift command $C_{GS}B$ is generated to effect a release of the original gear. According to one embodiment of the invention, a gearbox control unit (a so-called electronic control unit—ECU) may produce the secondary gearshift command $C_{GS}B$. Also the primary gearshift command $C_{GS}A$ may be originated by this gearbox control unit at a point in time when, based on a current operating condition for the vehicle's engine and transmission system, and an expected future operating condition, a gear shift-up is deemed appropriate. Following $t_3$ a new gear is synchronized, and at $t=t_4$ the new gear is engaged. Consequently, at this point in time the engine torque is again raised, and at $t=t_5$ a target torque $T_2$ for the new gear is reached.

Figure 2:
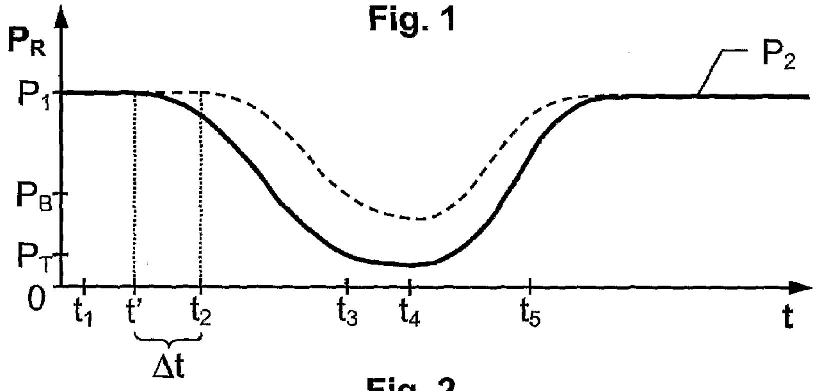
FIG. 2 shows a diagram which illustrates how a fuel pressure level in the engine's common rail fuel system is controlled to vary as the engine torque varies according to the example shown in FIG. 1, FIG. 3 schematically illustrates an engine according to one embodiment of the invention, which is adapted to be controlled in accordance with the proposed procedure.

FIG. 2 shows a diagram, which illustrates how a fuel pressure $P_R$ of an engine's common rail fuel system is controlled to vary over time t as the engine torque T varies according to the diagram of FIG. 1. Here, the vertical axis shows the fuel pressure $P_R$, and the horizontal axis represents the time t.

Initially, the common rail fuel system has a fuel pressure $P_R$ of $P_1$. In order to enable a repeatable engine torque when releasing the original gear at $t_3$, the fuel pressure $P_R$ is started to be decreased already at a point in time t' before $t_2$, when the reduction of the engine torque is initiated. Preferably, a time difference $\Delta t$ between the starting point t' of the pressure decrease and the starting point $t_2$ of engine torque lowering is variable, and dependant upon the fuel pressure $P_1$ before the gearshift and a target fuel pressure $P_T$ when releasing the original gear, such that a relatively large pressure difference $P_1-P_T$ results in a comparatively long time difference $\Delta t$, and vice versa.

At $t_3$, when the original gear is released, the fuel pressure $P_R$ has reached a value $P_T$. According to one embodiment of the invention, this value $P_T$ represents a threshold and the secondary gearshift command $C_{GS}B$ is generated only if the fuel pressure $P_R$ has reached $P_T$. Thereby, the threshold value $P_T$ may be selected sufficiently low to ensure a repeatable engine torque at $t_3$ when the gear is released. According to another embodiment of the invention, the secondary gearshift command $C_{GS}B$ is generated only if the engine torque T (see FIG. 1) has reached a particular threshold value th1. According to yet another embodiment of the invention, the secondary gearshift command $C_{GS}B$ is generated based on a combination of the fuel pressure criterion and the engine torque criterion, such that both the pressure threshold value $P_T$ and the torque threshold value th1 must have been reached before generating the secondary gearshift command $C_{GS}B$.

However, had the fuel pressure decrease been initiated first at $t_2$, when the engine torque reduction was started, the fuel pressure $P_R$ at $t=t_3$ would have been $P_B$. This alternative pressure curve is indicated by means of a dashed line. $P_B$ is substantially higher than $P_T$, SO that at $P_R=P_B$ a repeatable engine torque cannot be guaranteed because of the reasons discussed initially.

After having synchronized the new gear and engaged this gear at $t=t_4$, the fuel pressure $P_R$ is increased again. Preferably, this is performed in parallel with the engine torque raise (see FIG. 1), however a separated control of the fuel pressure $P_R$ is also conceivable according to the invention. Nevertheless, according to one embodiment of the invention, the increase of the fuel pressure $P_R$ is initiated no earlier than when the engine torque raise is commenced. Therefore, depending on the starting point of the fuel pressure increase and the increase rate, the fuel pressure $P_R$ may or may not have reached a new steady-state value $P_2$ at $t=t_5$, when the engine torque T has reached its target level $T_2$ for the new gear.

Figure 3:
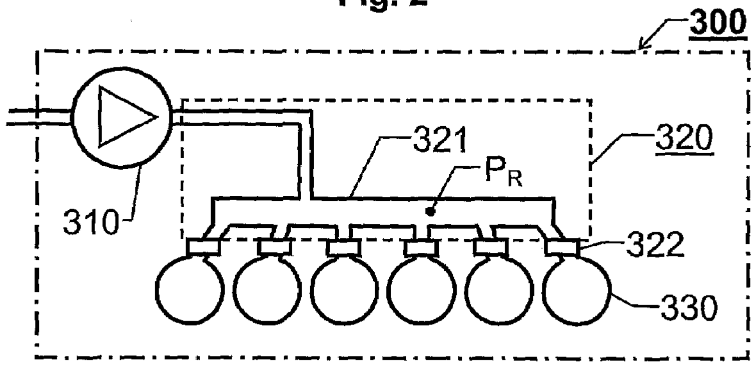

FIG. 3 schematically illustrates an engine 300 according to one embodiment of the invention, which is adapted to be controlled in accordance with the proposed procedure. The engine 300 has a common rail fuel system 320 adapted to feed in pressurized fuel into at least one combustion chamber 330 of the engine 300. FIG. 3 illustrates the combustion chambers of a six-cylinder row. Preferably, the common rail fuel system 320 is adapted to enter fuel in all combustion chambers of one such row, and if the engine has more than one row of cylinders each row is provided with a separate common rail.

The common rail fuel system 320, in turn, includes a common rail 321 and one fuel actuator 322 for each combustion chamber 330. Moreover, the engine 300 is provided with at least one fuel pump 310 to supply fuel from a fuel tank (not shown) to the common rail 321. Hence, by means of the pump 310, a desired fuel pressure $P_R$ can be accomplished in the common rail 321. Typically, intensifying the pumping action (i.e. rising the pump power and/or opening relevant valves to the common rail fuel system 320) attains a pressure increase; and contrary, a pressure decrease is attained by reducing the pumping action. A pressure sensor (not shown) registers the fuel pressure $P_R$ and transmits a data signal reflecting this parameter to a relevant control unit.

Figure 4:
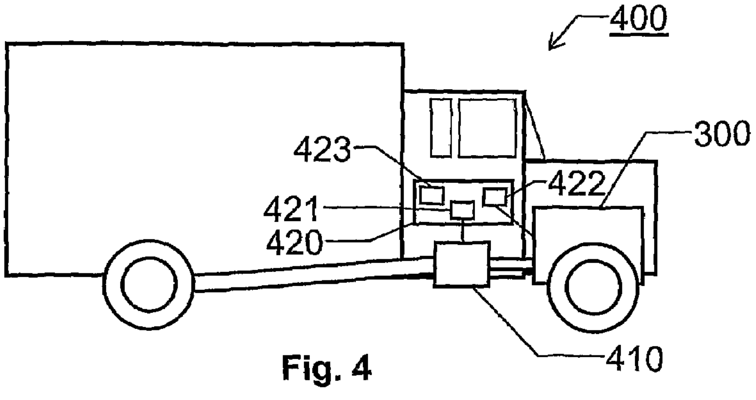
FIG. 4 depicts a motor vehicle including an arrangement according to one embodiment of the invention.

FIG. 4 depicts a motor vehicle 400 including an arrangement according to one embodiment of the invention.

An engine 300 having the above-proposed common rail fuel system drives the vehicle 400. The vehicle 400 also includes an automatically controlled gearbox 410 and a control system 420. The control system 420 is adapted to control the operation of the engine 300 and the gearbox 410, such that the engine's 300 engine torque is lowered and the fuel pressure in the engine's 300 common rail fuel system is decreased in connection with a gearshift procedure according to what has been described above with reference to the FIGS. 1 and 2.

Moreover, according to one embodiment of the invention, the control system 420 is adapted to raise the engine torque and increase the common rail fuel pressure after having engaged a new gear. However, preferably, the fuel pressure increase is not initiated before commencing the engine torque raise. According to another embodiment of the invention, the control system 420 includes a gearbox control unit 421 (e.g. an ECU), which is specifically adapted to generate the above-described secondary gearshift command $C_{GS}B$, and thus initiate the execution of the actual gearshift operation. According to one embodiment of the invention, the gearbox control unit 421 is adapted to generate the secondary gearshift command $C_{GS}B$ only if the fuel pressure in the common rail fuel system has reached a certain threshold value. Hence, it can be guaranteed that an original gear is not released until the fuel pressure is sufficiently low to allow a smooth operation of the vehicle 400.

According to another embodiment of the invention, the control system 420 includes at least one additional control unit, such as an engine ECU 422 for controlling the engine 300 and its operational parameters (e.g. engine torque and common rail fuel pressure). Furthermore, the gearbox control unit 421 and the engine control unit 422 may be attached to a command bus, for instance a CAN bus (CAN=Controller Area Network), such that the units 421 and 422 efficiently may interchange data and control signals, for example the primary and secondary gearshift commands $C_{GS}A$, and $C_{GS}B$. This is desirable because the automotive industry has developed towards an increased use of network solutions for controlling various kinds of units and processes in the vehicles. Of course, instead of a CAN bus the command bus may have any alternative format, e.g. according to the Time Triggered CAN (TTCAN), FlexRay, Media Oriented System Transport (MOST) or ByteFlight standard. By means of a CAN, or a similar network, a very large number of vehicle functions may be accomplished based on relatively few ECUs, and by combining resources from two or more ECUs a flexible and efficient over-all vehicular design is obtained. Moreover, multiple networks in a vehicle may be interconnected, so that ECUs belonging to different networks in the vehicle may exchange information. Typically, an ECU is used also to accomplish this bridging between the networks.

As an alternative to the command bus, the control units 421 and 422 may be co-located in, or integrated into, a single unit. In any case, the control system 420 contains a computer readable medium 423, which has a program recorded thereon. This program comprises software for controlling the steps of the procedure according to the invention when the program is run on a computer in one or more units of the control system 420.

Figure 5:
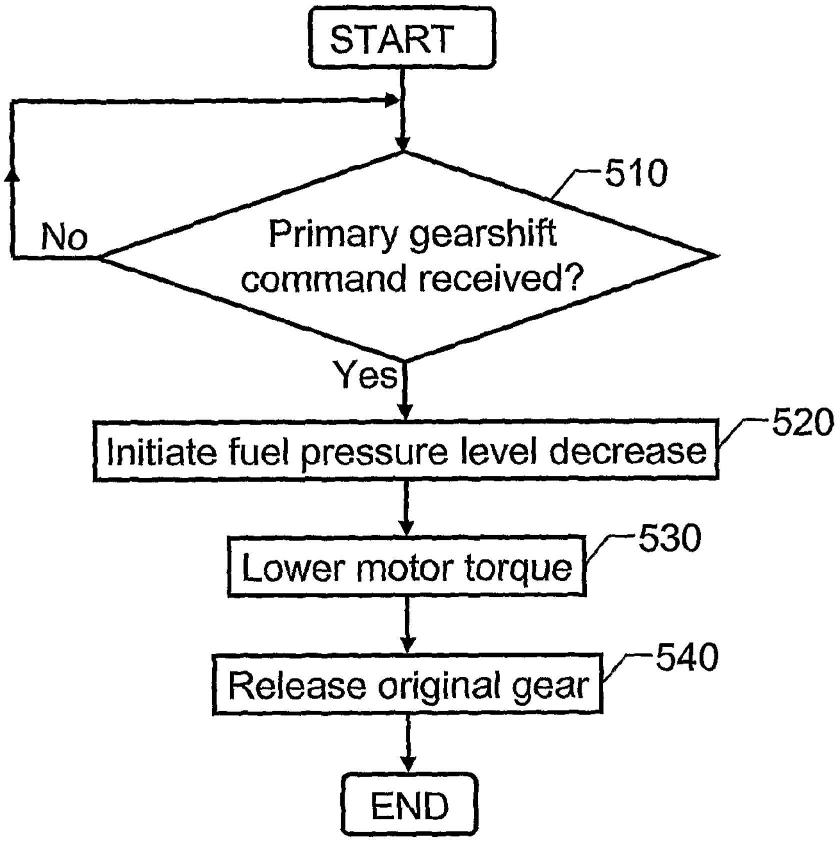
FIG. 5 shows a flow diagram which illustrates the general method according to the invention.

In order to sum up, the general method according to the invention will be described below with reference to the flow diagram in FIG. 5.

A first step 510 checks whether a primary gearshift command has been received, and if so a step 520 follows. Otherwise, the procedure loops back and stays in the step 510.

The step 520 initiates a decrease of the fuel pressure, and subsequently a step 530 lowers the engine torque. According to one embodiment of the invention, the engine torque is started to be lowered upon expiry of a particular time interval after initiating the decrease of the fuel pressure. The length of the time interval is here selected with respect to an initial fuel pressure in the common rail fuel system at reception of the primary gearshift command (i.e. step 510) in relation to a target fuel pressure which is desired when releasing an original gear.

Then, a step 540 releases the original gear and the procedure ends. In practice, of course, the gearshift operation is subsequently completed, i.e. a new gear is synchronized and engaged.

Figure 6:
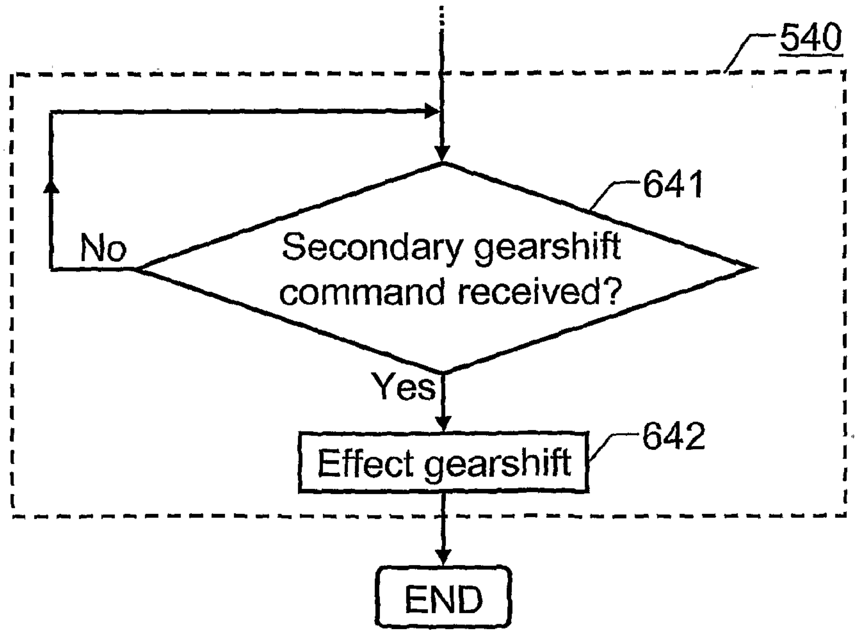
FIG. 6 shows a flow diagram illustrating one embodiment of the proposed method.

FIG. 6 shows a flow diagram illustrating one embodiment of the proposed method, which pertains to the step 540 above. A first sub-step 641 here investigates whether a secondary gearshift command has been received, and if so a step 642 follows. Otherwise the procedure loops back and stays in the step 641. The step 642 effects the gearshift by first releasing the original gear. Thereafter, a new gear is preferably synchronized and engaged. One advantage attained by the step 641 is that the gearshift may be made dependant upon one or more transmission related criteria. For instance, the secondary gearshift command is only generated (and thus the gear shifted) if the engine torque has reached a first threshold value, or if the fuel pressure in the common rail fuel system has reached a second threshold value.

All of the process steps, as well as any sub-sequence of steps, described with reference to the FIGS. 5 and 6 above may be controlled by means of a programmed computer apparatus. Moreover, although the embodiments of the invention described above with reference to the drawings comprise computer apparatus and processes performed in computer apparatus, the invention thus also extends to computer programs, particularly computer programs on or in a carrier, adapted for putting the invention into practice. The program may be in the form of source code; object code, a code intermediate source and object code such as in partially compiled form, or in any other form suitable for use in the implementation of the process according to the invention. The carrier may be any entity or device capable of carrying the program. For example, the carrier may comprise a storage medium, such as a Flash memory, a ROM (Read Only Memory), for example a CD (Compact Disc) or a semiconductor ROM, an EPROM (Erasable Programmable Read-Only Memory), an EEPROM (Electrically Erasable Programmable Read-Only Memory), or a magnetic recording medium, for example a floppy disc or hard disc. Further, the carrier may be a transmissible carrier such as an electrical or optical signal which may be conveyed via electrical or optical cable or by radio or by other means. When the program is embodied in a signal which may be conveyed directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

The invention is not restricted to the described embodiments in the figures, but may be varied freely within the scope of the claims.

The invention claimed is:

1. A vehicle arrangement comprising:

an engine having at least one combustion chamber;

a common rail fuel system operable to feed in pressurized fuel into the at least one combustion chamber of the engine, an automatically controlled gearbox for output from the engine and having a plurality of gear settings including an original gear setting and a second one of the gear settings, and a control system operable to control operation of the engine and of the gearbox by lowering engine torque of the engine in response to a primary gearshift command wherein the original gear setting is released after the control system is operated to lower the engine torque and, the control system is operable to initiate a decrease of fuel pressure in the common rail fuel system in response to the primary gearshift command prior to commencement of lowering of the engine torque.

2. A vehicle arrangement according to claim 1, wherein the control system is operable to raise the engine torque after the second one of the gear settings of the gear box is engaged, and initiate an increase of the fuel pressure no earlier than commencing the raising of the engine torque.

3. A vehicle arrangement according to claim 1, further comprising the control system includes a gearbox control unit operable to generate a secondary gearshift command operable to cause a release of the original gear setting of the gearbox.

4. A vehicle arrangement according to claim 3, wherein the gearbox control unit is operable to generate the secondary gearshift command if the engine torque has reached a first threshold value.

5. A vehicle arrangement according to claim 3, wherein the gearbox control unit is operable to generate the secondary gearshift command only if the fuel pressure in the common rail fuel system has reached a second threshold value.

6. A vehicle arrangement according to claim 4, wherein the control system comprises a command bus operable to transmit the primary and secondary gearshift commands.

7. A vehicle arrangement according to claim 6, wherein the control system comprises at least one electronic control unit which is connected to the command bus and is operable to control the operation of at least one of the engine, the gearbox and the common rail fuel system.

8. A motor vehicle comprising a vehicle arrangement according to claim 1, and elements of the vehicle driven by the engine through the gearbox.

9. A method of operating a vehicle having an engine in which pressurized fuel is fed into at least one combustion chamber of the engine by means of a common rail fuel system, the method comprising:

receiving a primary gearshift command, lowering an engine torque of the engine in response to the primary gearshift command, and then releasing an original gear setting, initiating a decrease of a fuel pressure in the common rail fuel system in response to the primary gearshift command, and initiating the pressure decrease prior to commencing the lowering of the engine torque.

10. A method according to claim 9, further comprising engaging a new gear setting, and raising the engine torque after having engaged the new gear setting, and increasing the fuel pressure in the common rail fuel system after having engaged the new gear setting.

11. A method according to claim 10, further comprising initiating the pressure increase no earlier than commencing the torque raise.

12. A method according to claim 9, further comprising supplying a secondary gearshift command, and requesting a release of an original gear setting in response to the secondary gearshift command.

13. A method according to claim 12, further comprising generating the secondary gearshift command if the engine torque has reached a first threshold value.

14. A method according to claim 12, further comprising generating the secondary gearshift command only if the fuel pressure in the common rail fuel system has reached a second threshold value.

15. A method according to claim 9, further comprising initiating the decrease of the fuel pressure at a first with a time difference to a second time when the lowering of the engine torque is commenced, and selecting the time difference between the first and second times with respect to an initial fuel pressure in the common rail fuel system at reception of the primary gearshift command in relation to a target fuel pressure desired upon releasing the original gear setting.

16. The method of claim 9, wherein the method is executed by a computer program loaded in an internal memory of a computer.

17. The method of claim 9, wherein the vehicle includes a computer readable medium having a program recorded thereon, wherein the program causes a computer to control the method.

18. A computer program product comprising a computer readable medium comprising computer program code that executes to control operations of a vehicle having an engine in which pressurized fuel is fed into at least one combustion chamber of the engine by means of a common rail fuel system, the computer program code comprising:

a lower engine torque command that electronically lowers an engine torque of the engine in response to a primary gearshift command, and then electronically releases an original gear setting, a decrease fuel pressure command that electronically initiates a decrease of a fuel pressure in the common rail fuel system in response to the primary gearshift command, and initiates the pressure decrease prior to commencing the lowering of the engine torque.

19. A vehicle arrangement having a computer readable medium provided with computer program code for operating the vehicle arrangement, the vehicle arrangement comprising:

an engine having at least one combustion chamber;

a common rail fuel system operable to feed in pressurized fuel into the at least one combustion chamber of the engine, an automatically controlled gearbox for output from the engine and having a plurality of gear settings including an original gear setting and a second one of the gear settings, and a control system that operates with the computer readable medium to electronically control operation of the engine and of the gearbox in response to commands in the computer program code to lower engine torque of the engine in response to a primary gearshift command, wherein the original gear setting is released after the control system is operated to lower the engine torque and, the control system is further operable to electronically initiate a decrease of fuel pressure in the common rail fuel system in response to the commands in the computer program code and the primary gearshift command prior to commencement of lowering of the engine torque.

20. A computer program product for controlling operations of a vehicle having an engine in which pressurized fuel is fed into at least one combustion chamber of the engine by means of a common rail fuel system, the computer program product comprising a computer readable medium comprising computer program code means which, when run on a control unit operable to control fuel injection into the engine, causes the control unit to:

lower an engine torque of the engine in response to a primary gearshift command, and then release an original gear setting, and initiate a decrease of a fuel pressure in the common rail fuel system in response to the primary gearshift command, and initiate the pressure decrease prior to commencing the lowering of the engine torque.

* * * * *